Dec. 21, 1943.   J. A. HINKAMP ET AL   2,337,390
METHOD OF PRODUCING SELF-ADHERING GAUZE BANDAGES
Original Filed July 13, 1936
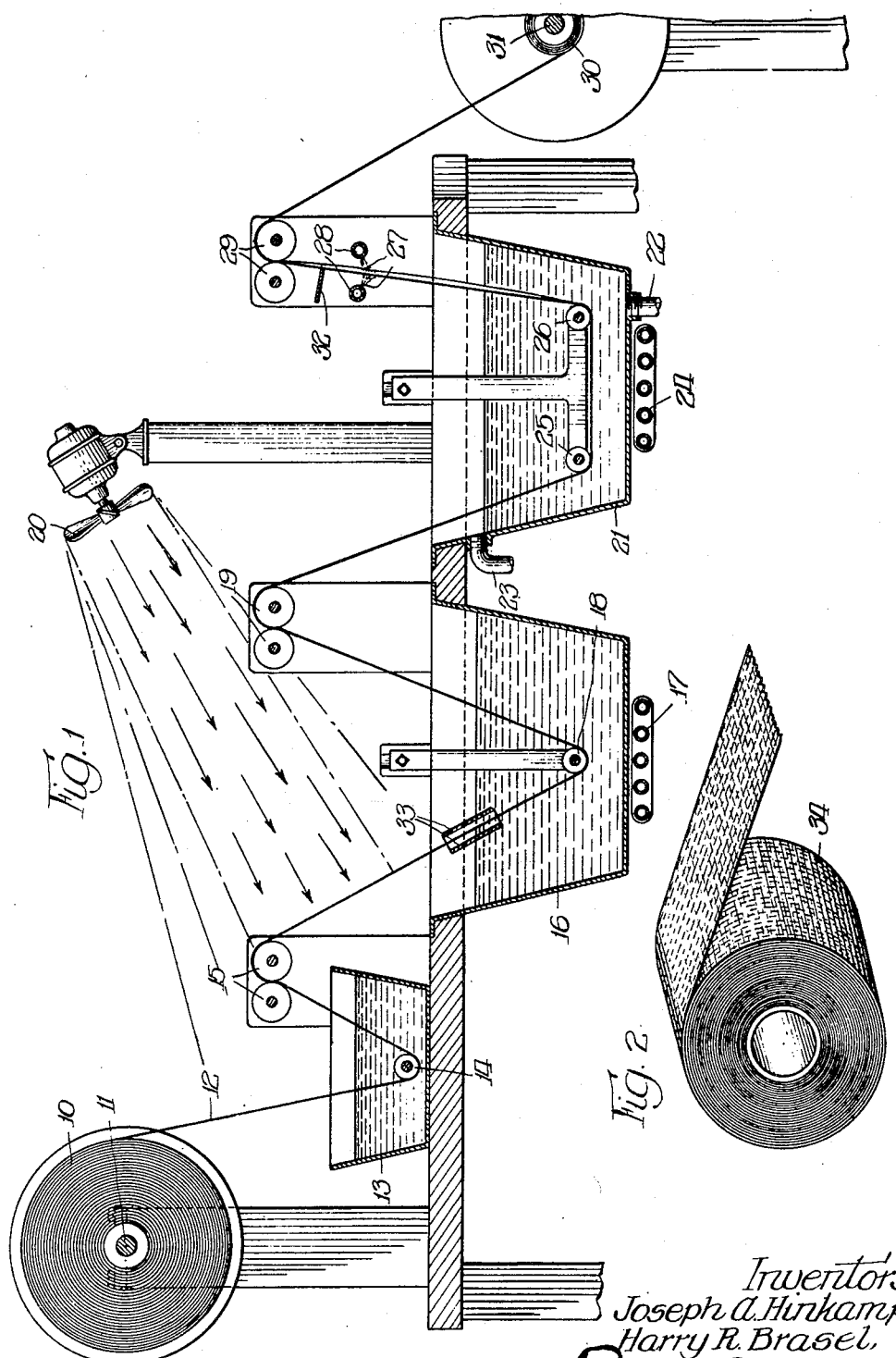
Inventors:
Joseph A. Hinkamp,
Harry R. Brasel, Patented Dec. 21, 1943

2,337,390

UNITED STATES PATENT OFFICE 2,337,390

METHOD OF PRODUCING SELF-ADHERING GAUZE BANDAGES

Joseph A. Hinkamp, Chicago, and Harry R. Brasel, Lake Bluff, Ill., assignors to General Bandages, Inc., Chicago, Ill., a corporation of Illinois Original application July 13, 1936, Serial No. 90,346. Divided and this application September 9, 1939, Serial No. 294,056

3 Claims. (Cl. 117—66)

This is a divisional application of Serial No. 90,346, now Patent No. 2,190,378.

One of the objects of this invention is to provide a method whereby a self-adhering gauze bandage can be produced which will be soft, white and porous and which will retain those characteristics for a considerable period of time.

Another object of the invention is to provide a commercially satisfactory continuous method of producing a latex-impregnated gauze bandage.

While the foregoing statements are indicative in a general way of the nature of the invention, other more specific objects and advantages will be apparent to those skilled in the art upon a full understanding of the improved bandage and the method employed in preparing the same.

A preferred embodiment of the invention is presented herein for the purpose of exemplification, but it will of course be appreciated that the invention may be embodied and practiced in other slightly modified forms and ways coming equally within the scope of the appended claims.

In the accompanying drawing:

Fig. 1 is a side view of an apparatus suitable for use in practicing the new method; and Fig. 2 is a perspective view of a roll of the finished bandage.

The improved bandage has much the appearance of the plain gauze bandage, but it has the additional property of adhering to itself when applied as a wrapping. It is merely necessary to lap the bandage on itself and rub the free end down gently, whereupon firm adherence will be obtained. The bandage will not stick to skin, hair or clothing. It is soft and porous, and is pure white in color, although it may be produced in different colors if desired by adding a color to the latex solution or else by using colored gauze to start with.

The bandage is prepared by being impregnated with a small quantity of rubber latex from which the proteins present in the serum are in large measure eliminated in the course of the treatment.

In practicing the invention, a large roll 10 of ordinary white bleached surgical gauze is mounted on a spindle 11 and the web 12 of gauze from the roll is led down into a tank 13 which is filled with liquid latex of approximately 60 per cent rubber content. The gauze passes down around a roller 14 in the bottom of the tank and then leaves the tank and passes between a pair of wringer rollers 15 which squeeze the excess latex out of the gauze. From the rollers 15 the latex-saturated gauze passes down into a second tank 16 which is filled with a solution of acetic acid. A 1% solution will give good results. This solution is preferably kept at about 180° F. temperature by means of a heating coil 17 beneath the tank, although good results have been obtained when the acid bath is allowed to remain at room temperature. Some heat is desirable, however, because it tends to speed up the coagulation of the latex. The gauze after entering the tank 16 passes down around a roller 18 near the bottom of the tank and upon leaving the tank passes between a pair of wringer rollers 19 which squeeze the excess acid out of the gauze.

The liquid latex in the tank 13 ordinarily contains ammonia as a preservative and as this ammonia must be neutralized by the acid before any setting of the rubber content can take place some of the latex may wash out of the gauze in the form of a scum. This scum, if subsequently picked up by the gauze as it leaves the acid tank, will spoil the product. To prevent this we direct a blast of air against the gauze in a direction away from the acid bath just before the gauze enters the latter. A fan 20 can be used for this purpose, the fan being located above and beyond the rollers 19 at a downward inclination, so as to blow directly against the gauze after the gauze leaves the rollers 15 and before it enters the acid bath. This air current carries off enough of the ammonia to allow the acid to produce a quick coagulation of the rubber in the latex.

From the rollers 19 the gauze passes downwardly into a third tank 21 which is filled with water which continuously circulates through the tank, entering through the pipe 22 and leaving through the pipe 23. The water in the tank 21 rinses all of the free acid out of the treated gauze. This water is preferably heated somewhat, by means of a heating coil 24 beneath the tank. Upon entering the tank 21 the gauze passes first around a roller 25 and then around a roller 26 which is spaced horizontally some distance from the roller 25 in order to give the water in the tank ample opportunity in which to circulate through the interstices of the gauze. Upon leaving the tank 21 the gauze is further rinsed by being sprayed with jets of fresh water from two perforated pipes 28 at opposite sides of the gauze. Beyond the jets the gauze passes upwardly between a pair of wringer rollers 29 which squeeze as much water as possible out of the gauze. From the rollers 29 the gauze is rolled up again into a roll 30 on a power driven spindle 31.

The thusly treated roll 30 of bandage on the spindle 31 may be cut into the desired widths and lengths during the rolling up process, or all of the bandage from the roll 10 may be run into the roll 30 and then the latter removed and transferred to any suitable form of measuring and cutting machine, the cutting being done either before or after the treated gauze has been dried. As the gauze leaves the rinsing tank and approaches the last pair of rollers 29, it is preferably acted upon by a curved blade 32 which serves to keep the gauze spread out laterally so as to present a smooth surface when being rolled up on the spindle 31.

The gauze which is used is preferably of about 36 x 36 mesh, and the roll may be 500 yards long and 36 inches wide, although it will of course be appreciated that any other width or length or size of mesh, within reasonable limits, may be employed. In passing through the bath of liquid latex in the tank 13 the gauze becomes thoroughly impregnated and saturated with the latex but the rollers 15 prevent any appreciable quantity of the latex from being carried over into the acid bath. As soon as the gauze enters the acid solution in the tank 16, the acid immediately neutralizes the alkaline preservative in the latex and thereupon coagulates or sets the rubber content of the latex, leaving the interstices of the gauze more or less open and free to permit circulation of the acid solution therethrough. Upon subsequently entering the water in the tank 21 the remaining acid is rinsed out of the gauze, which rinsing insures the removal of all the serum or protein content of the latex liberated upon the setting of the rubber content.

In place of the air blast provided by the fan 20, a pair of baffles 33 may be mounted in the tank, partly submerged in the acid solution, at opposite sides of the entering gauze, for confining the scum and preventing it from floating over and clinging to the gauze which has been treated.

If desired, an additional tank containing a second rinse water and/or an antiseptic bath may be added after the tank 21, but ordinarily the sterilization of the completed bandage will be effected by heating the packaged bandage in a special oven designed for that purpose.

A small roll 34 of the improved bandage in a 1" or 2" width, is shown in Fig. 2. It has much the appearance of ordinary gauze but because of its adhering characteristic can take the place of both gauze and adhesive tape.

We claim:

1. The process of producing a gauze bandage which is soft, porous and self-adherent, without being adherent to skin and hair, and which will retain such characteristics upon aging, without discoloration, which consists in passing a web of gauze through a tank filled with liquid rubber latex containing an alkaline preservative, then removing the excess latex from the gauze upon leaving the tank, then removing a substantial part of the alkaline preservative from the latex remaining on the gauze, then passing the gauze through a tank filled with a coagulating solution, whereby to coagulate the latex remaining on the gauze, then removing the excess solution from the gauze upon leaving the second tank, and then passing the gauze through a tank filled with rinse water.

2. The process of producing a gauze bandage which is soft, porous and self-adherent, without being adherent to skin and hair, and which will retain such characteristics upon aging, without discoloration, which consists in passing a web of gauze through a tank filled with liquid rubber latex containing an alkaline preservative, removing the excess latex from the gauze upon leaving the tank, directing a current of air against the gauze, passing the gauze through a tank filled with a solution containing a coagulating acid, removing the excess acid from the gauze upon leaving the second tank, and passing the gauze through a tank filled with rinse water.

3. The process of producing a gauze bandage which is soft, porous and self-adherent, without being adherent to skin and hair, and which will retain such characteristics upon aging, without discoloration, which consists in passing a web of gauze through a tank filled with liquid rubber latex containing an alkaline preservative, removing the excess latex from the gauze upon leaving the tank, directing a current of air against the gauze, passing the gauze through a tank filled with a solution containing acetic acid, removing the excess acid from the gauze upon leaving the second tank, and passing the gauze through a tank filled with rinse water.

JOSEPH A. HINKAMP.
HARRY R. BRASEL.